(12) United States Patent
Johnson

(10) Patent No.: US 6,378,196 B1
(45) Date of Patent: Apr. 30, 2002

(54) METHOD AND APPARATUS FOR STIFFENER LOCATION AND POSITIONING

(75) Inventor: Carl Johnson, Highland, IN (US)

(73) Assignee: Ogden Engineering Corporation, Schererville, IN (US)

( * ) Notice: Subject to any disclaimer, the term of this patent is extended or adjusted under 35 U.S.C. 154(b) by 0 days.

(21) Appl. No.: 09/003,349

(22) Filed: Jan. 6, 1998

(51) Int. Cl.⁷ .............................................. B23P 21/00
(52) U.S. Cl. .............................. 29/787; 29/795; 29/822
(58) Field of Search ........................ 29/771, 772, 786, 29/793, 794, 795, 822, 897, 897.32, 559, 787, 281.5; 212/318, 319; 228/25, 30; 219/158, 125.1, 136; 269/43, 8, 41, 56

(56) References Cited

U.S. PATENT DOCUMENTS

| | | | |
|---|---|---|---|
| 1,640,437 A | 8/1927 | Chapman | |
| 1,910,259 A | 5/1933 | Raymond | |
| 2,204,207 A | 6/1940 | Coburn | |
| 2,288,796 A * | 7/1942 | Edwards | 29/252 |
| 2,353,638 A * | 7/1944 | Beaulieu et al. | 198/346 |
| 2,986,075 A * | 5/1961 | Ranney | 269/9 |
| 3,429,288 A | 2/1969 | Suit | |
| 3,444,352 A * | 5/1969 | Ogdon et al. | 219/73.2 |
| 3,561,663 A * | 2/1971 | Wenzlaff | 29/252 |
| 3,601,882 A * | 8/1971 | McRae | 29/430 |
| 3,702,914 A * | 11/1972 | Noura | 219/73 |
| 3,712,529 A | 1/1973 | Ozawa et al. | |
| 4,003,326 A | 1/1977 | Horii et al. | |
| 4,169,977 A | 10/1979 | Pedersen | |
| 4,232,209 A | 11/1980 | Pedersen | |
| 4,346,808 A | 8/1982 | Garlung et al. | |

* cited by examiner

Primary Examiner—Mark Rosenbaum
Assistant Examiner—T. Nguyen
(74) Attorney, Agent, or Firm—Patula & Associates P.C.

(57) ABSTRACT

A method and apparatus for locating, positioning and fitting stiffener members to panels for use in barge construction. The method and apparatus includes a stiffener locator assembly, a stiffener handling/loading gantry and a stiffener fitting gantry. In use, the stiffener handling/loading gantry sequentially moves the stiffeners and loads them over the barge panels and into successive stiffener locators positioned along the assembly. The stiffener fitting gantry then successively presses the stiffeners against the barge panels for tack welding thereto.

28 Claims, 18 Drawing Sheets

METHOD AND APPARATUS FOR STIFFENER LOCATION AND POSITIONING

The present invention relates to a method and apparatus for locating and positioning stiffener members on a plate or panel and, in particular, a method and apparatus for locating, positioning and fitting reinforcing stiffener beams on plates or panels for use in barge construction, specifically a barge construction assembly including a stiffener handling/loading gantry for loading stiffeners along a stiffener locator assembly for positioning and fastening the stiffener to large, flat steel plates or panels via a stiffener fitting gantry to form a barge bottom.

BACKGROUND OF THE INVENTION

The outer wall of a barge bottom is constructed of flat steel plates which have been seam welded together to form a larger flat plate called a panel. The seam welds are almost always made in the direction of the width of the finished barge, transverse direction.

Flat plate panels are subsequently reinforced by adding angle bars or stiffeners positioned vertically on the flat plate panel to provide rigidity to the panel. The stiffeners are placed on the panel parallel to the panel seam welds also in the direction of the barge width (transverse to the panel length). These stiffeners are placed on pre-determined spacings indicated by manually drawn chalk lines and are customarily located and held in place manually for fitting and tack welding.

However, such manual fitting of stiffeners is very laborious, time consuming, inaccurate in locating and positioning and dangerous to the workers.

Accordingly, there is a need for a method and apparatus for locating, positioning and fitting stiffeners on barge panels which is accurate and efficient. The present invention fulfills such a need.

BRIEF SUMMARY OF THE INVENTION

The present invention comprises a barge construction assembly including three main components: a stiffener locator assembly, a stiffener handling/loading gantry, and a stiffener fitting gantry. The stiffener locator assembly includes a plurality of opposing pairs of stiffener locator units on opposite sides of a conveyor system. Each stiffener locator unit includes at least one stiffener locator. Barge panels are moved into position between the stiffener locator units. The stiffener handling/loading gantry sequentially moves stiffener members from a stack and lowers them into successive stiffener locators. Once the stiffener members have been loaded into the stiffener locator, the stiffener fitting gantry successively presses the stiffener members against the barge panel and preliminarily tack welds them thereto.

Accordingly, it is the principle object of the present invention to provide a method and apparatus for positioning and locating stiffener members on a panel member.

It is a further object of the invention to provide a stiffener locator assembly for barge construction.

It is also an object of the invention to provide a stiffener loading gantry for barge construction.

It is an additional object of the present invention to provide a stiffener fitting gantry for barge construction.

It is another object of the present invention to provide an efficient automated method and apparatus for locating and positioning stiffeners without the need for chalk lines.

Numerous other advantages and features of the invention will become readily apparent from the detailed description of the preferred embodiment of the invention, from the claims, and from the accompanying drawings in which like numerals are employed to designate like parts throughout the same.

BRIEF DESCRIPTION OF THE DRAWINGS

A fuller understanding of the foregoing may be had by reference to the accompanying drawings wherein.

DETAILED DESCRIPTION OF THE PREFERRED EMBODIMENT OF THE PRESENT INVENTION

Figure 1:
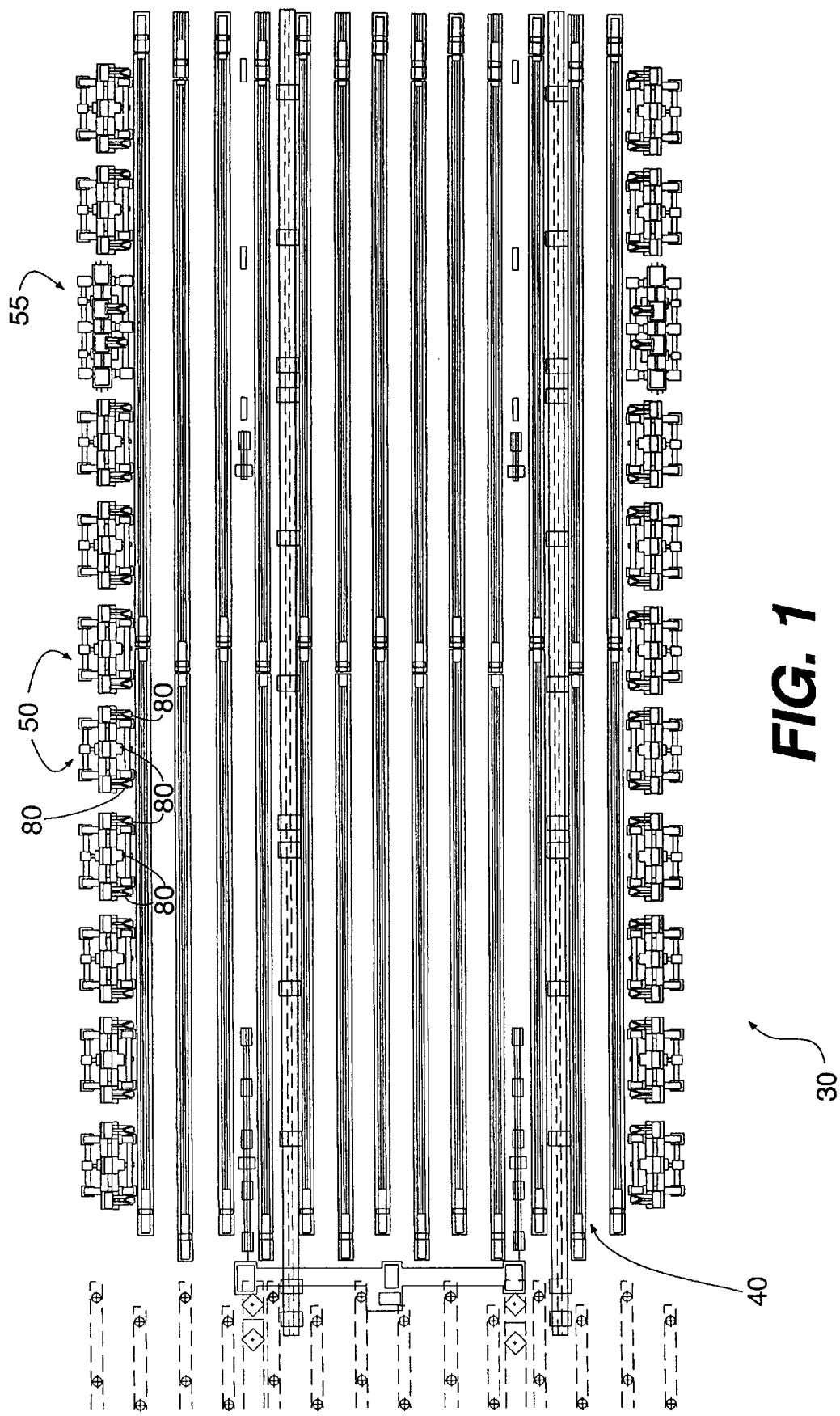
FIG. 1 is a top view of the stiffener locator assembly of the present invention.

While the invention is susceptible of embodiment in many different forms, there is shown in the drawings and will be described herein in detail a preferred embodiment of the invention. It should be understood however that the present disclosure is to be considered an exemplification of the principles of the invention and is not intended to limit the spirit and scope of the invention and/or claims of the embodiment illustrated.

FIG. 1 illustrates the top view of the stiffener locator assembly 30 of the present invention 10. The stiffener locator assembly 30 includes a plurality of pairs of stiffener locator units 50 and 55. Each pair of stiffener locator units 50 and 55 are located on opposite sides of a conveyor system 40 which supports the panel members 25 (see FIG. 11). Stiffener locator units 50 and 55 are similar with the main difference being unit 50 includes three stiffener locators 80, while unit 55 includes four stiffener locators 80.

The panel stiffeners 20 (see FIG. 13) preferably are angle bars which are formed from 5/16 in. thick plate. The height of each angle bar is approximately 14½ in. The flange width of each angle bar is approximately 5 in. and 9 in. alternating on each successive stiffener to be placed on the panel 25 (see FIG. 11).

Preferably, each stiffener locator unit 50 is capable of accepting and locating three stiffeners, with the exception of stiffener locator unit 55, which locates four stiffeners. This pair of locator units 55 is each equipped to make spacing adjustments to work in conjunction with adjacent locators 80 on either side to conform to certain panel variations, as is discussed below.

All the stiffener locator units 50 and 55 are hydraulically powered and controlled. Sequencing is selectable through a control panel to satisfy panel variation in size and configuration.

In a preferred embodiment, the first eight pairs of locator units 50 have stiffener locators 80 which are designated for one size panel which has stiffener spacing equal at 2 ft. 3 in. Each pair of locator units 50 is capable of locating three stiffeners. It should be understood however that various configurations are possible by varying the number of stiffener locators 80 and their spacing.

The ninth pair of stiffener locator units 55 are designed for two separate panel and stiffener spacing configurations. This pair of locator units 55 is capable of locating four panel stiffeners with the added capability of adjustment to different stiffener spacing, for example, having an adjustment range from 2 ft. 1½ in. to 2 ft. 2 in. However, variation in the number of stiffener locators 80 and their spacing is foreseeable. The remaining two pairs of stiffener locator units 55 are preferably used for one type of panel which has stiffener spacings at 2 ft. 2 in.

The stiffener locator units 50 and 55 provide three basic functions. Selected locator units are used to push the flat panel 25 to be stiffened into a squared and centered position relative to proper stiffener location and spacing. Those locator units 50 and 55 usable to a specific panel configuration are preposition inward to a preliminary and non-precise location to accept stiffeners 20 being loaded into the locator 80 by a stiffener loading gantry 200 (see FIGS. 10–13). This preliminary locator position is controlled by limit switches which control the travel of the hydraulic actuating cylinders. The preliminary and non-precise position of the locator units in this part of the sequence exposes the tapered and open portions 94, 96 of locator guide plates 90, 92, respectively (see FIG. 8) of the stiffener locators 80 to allow the stiffener loading gantry 200 to insert each stiffener 20 into the locators 80 without interference or precise accuracy (see FIG. 18). The third and final movement of the stiffener locator units 50 and 55 is to actuate inward toward the center of the panel. During this function, the shape and taper of each stiffener locator 80 force the extreme ends of each stiffener 20 to rotate to a vertical position (position shown in FIG. 19). The two halves 90, 92 of each locator 80 are assembled with minimum clearance between them to accept the thickness of the stiffener material providing 1/32 in. accuracy.

Figure 2:
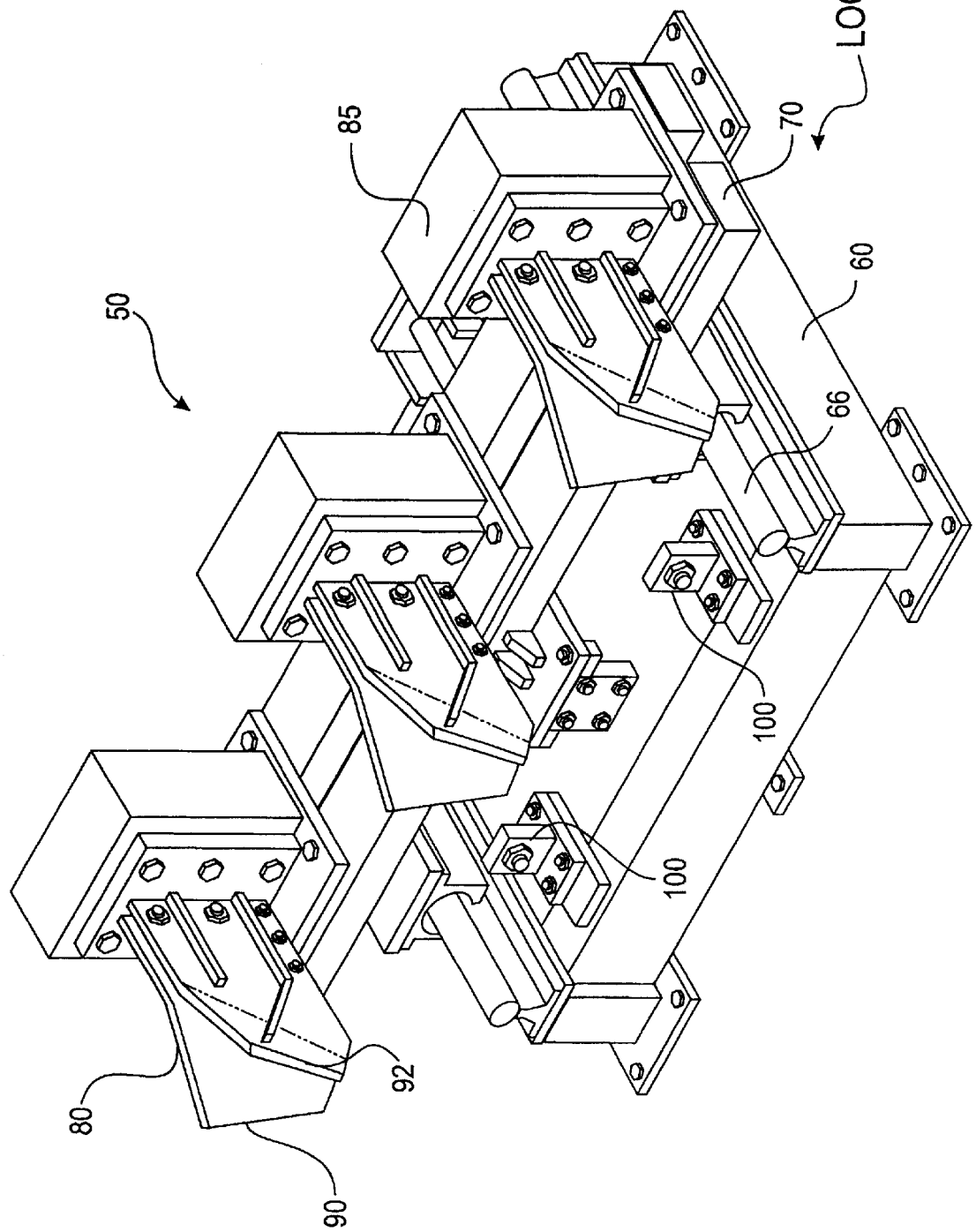
FIG. 2 is a perspective view of a stiffener locator unit of the present invention having three stiffener locators.

FIG. 2 illustrates a perspective view of a stiffener locator unit 50 having three stiffener locators 80 of the present invention 10.

The basic design of each stiffener locator unit 50 comprises a floor mounted frame 60 constructed of structural steel tubing and steel plates welded together to form a platform for the movable upper frame 70 of the locator unit 50. Upper frame 70 is also constructed of structural steel tubing and plates welded together to form a movable carriage for the stiffener locators 80. The upper frame/carriage 70 is mounted to the lower frame on round machined rails 66 and composite bushing type bearings providing reciprocating motion controlled and powered by a hydraulic cylinder and circuitry. Stiffener locator support assemblies 85 are attached to the upper frame/carriage 70 to support the locators 80. Stiffener locators 80 included a pair of locator guide plates 90, 92.

Figure 3:
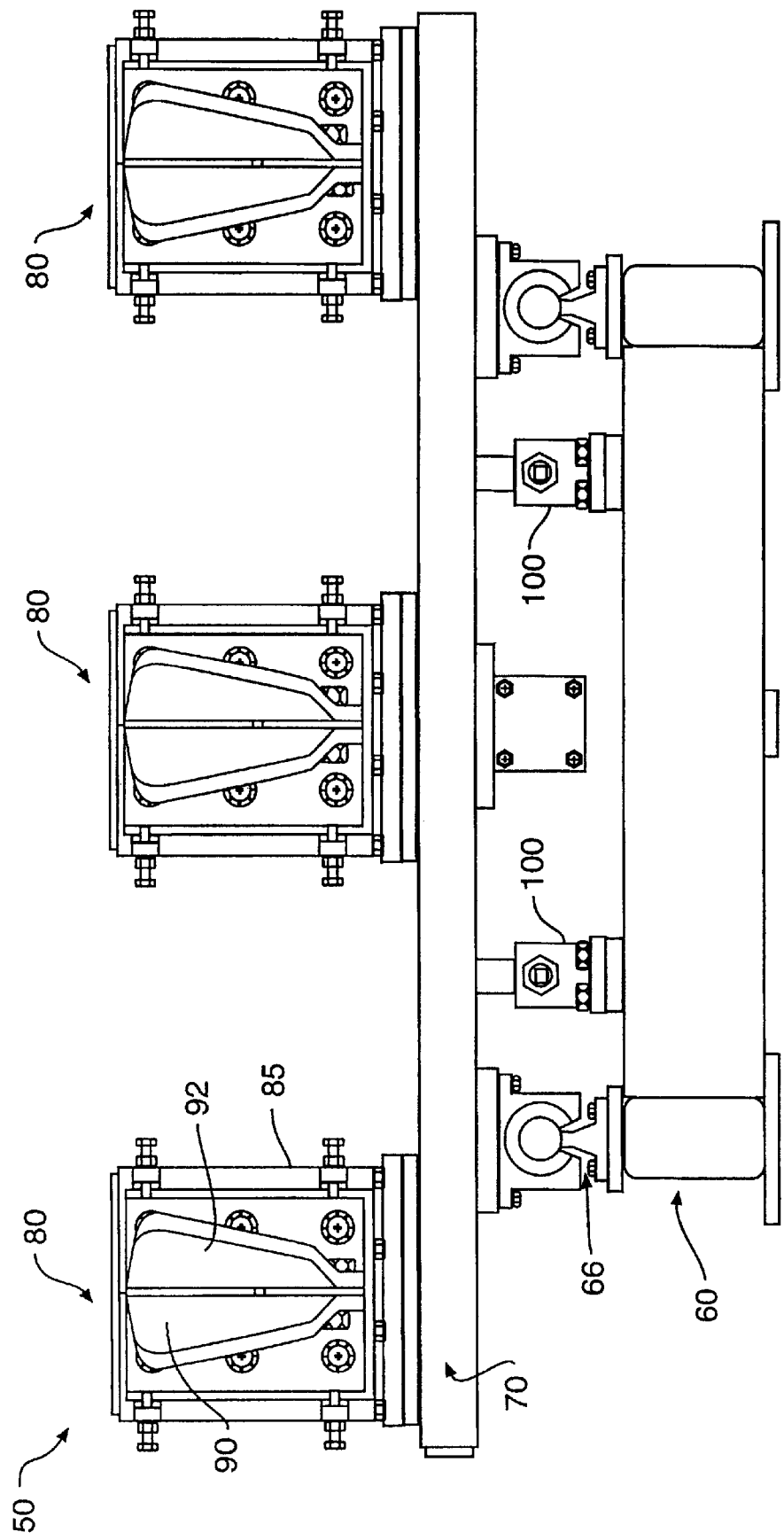
FIG. 3 is a front view of the stiffener locator unit of FIG. 2.

FIG. 3 illustrates a front view of stiffener locator unit 50 of FIG. 2. As can be seen, upper frame/carriage 70 rests upon rails 66 of frame 60. Stiffener locator support assemblies 85 support the stiffener locators 80 which include locator guide plates 90 and 92.

Figure 4:
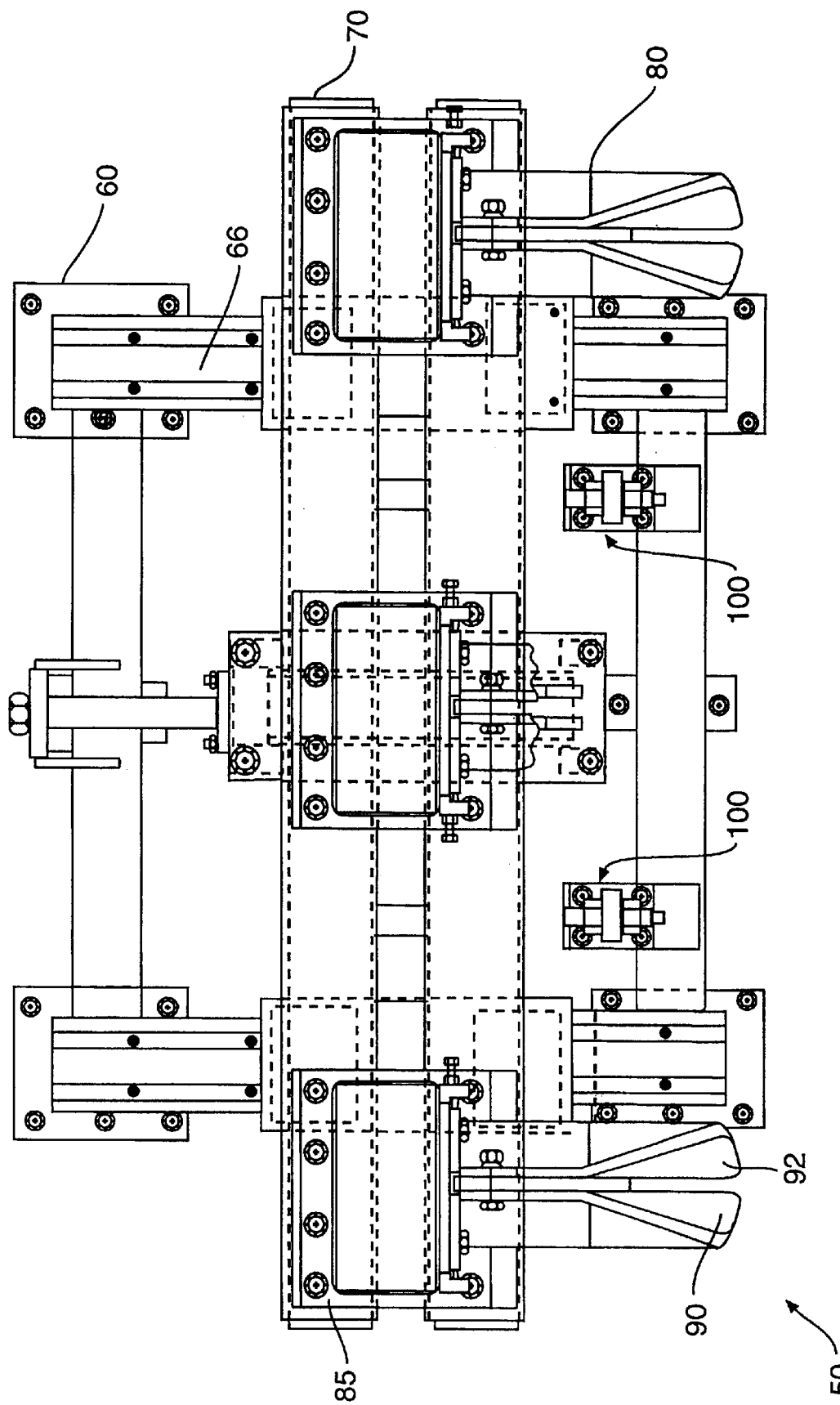
FIG. 4 is a top view of the stiffener locator unit of FIG. 2.

FIG. 4 illustrates the top view of the stiffener locator unit 50 of FIG. 2 of the present invention 10, further illustrating frame 60, rails 66, carriage 70, locators 80, support assemblies 85, guide plates 90 and 92, and stops 100. The center locator 80 is not shown in FIG. 4.

Figure 5:
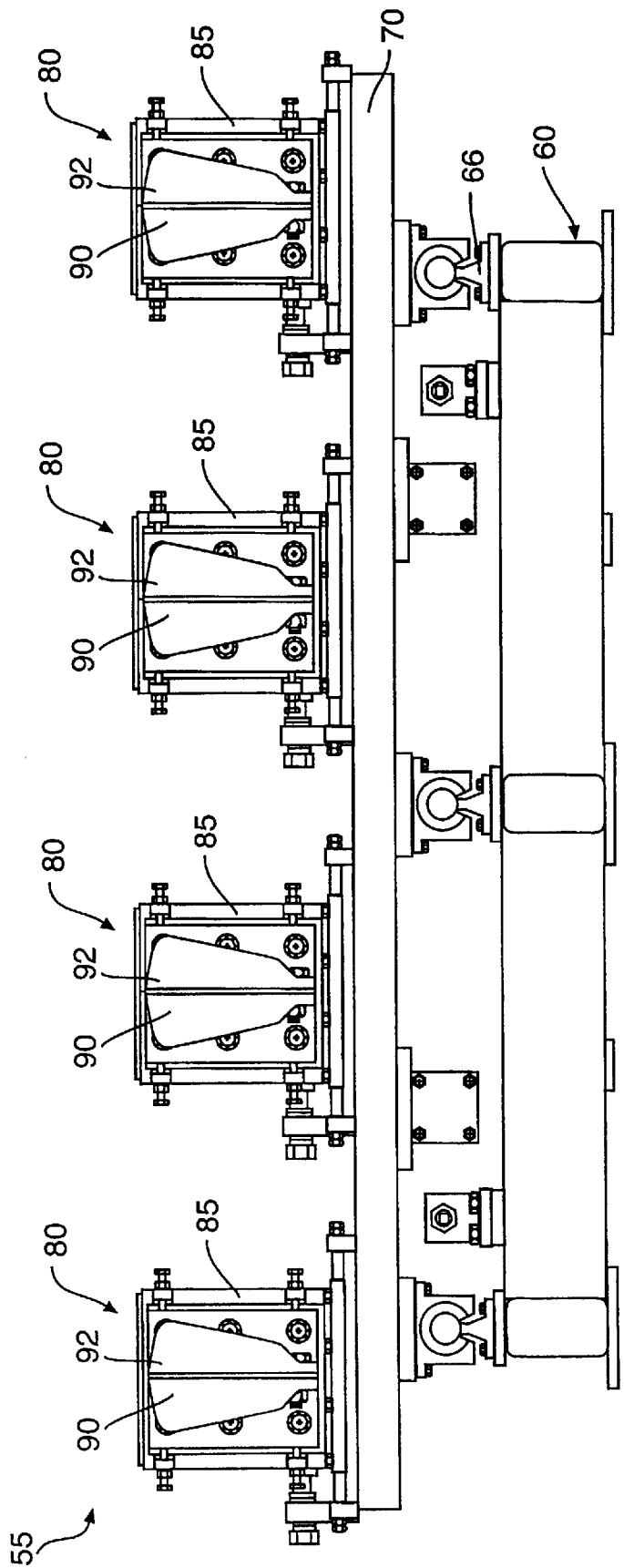
FIG. 5 is a top view of the stiffener locator unit of the present invention having four stiffener locators.

FIG. 5 illustrates the front view of the stiffener locator unit 55 having four stiffener locators 80 of the present invention 10. This stiffener locator unit 55 functions the same in all respects with the three locator stiffener locator units 50 with the exception of having an additional locator 80, and providing for selective adjustment of locators.

Figure 6:
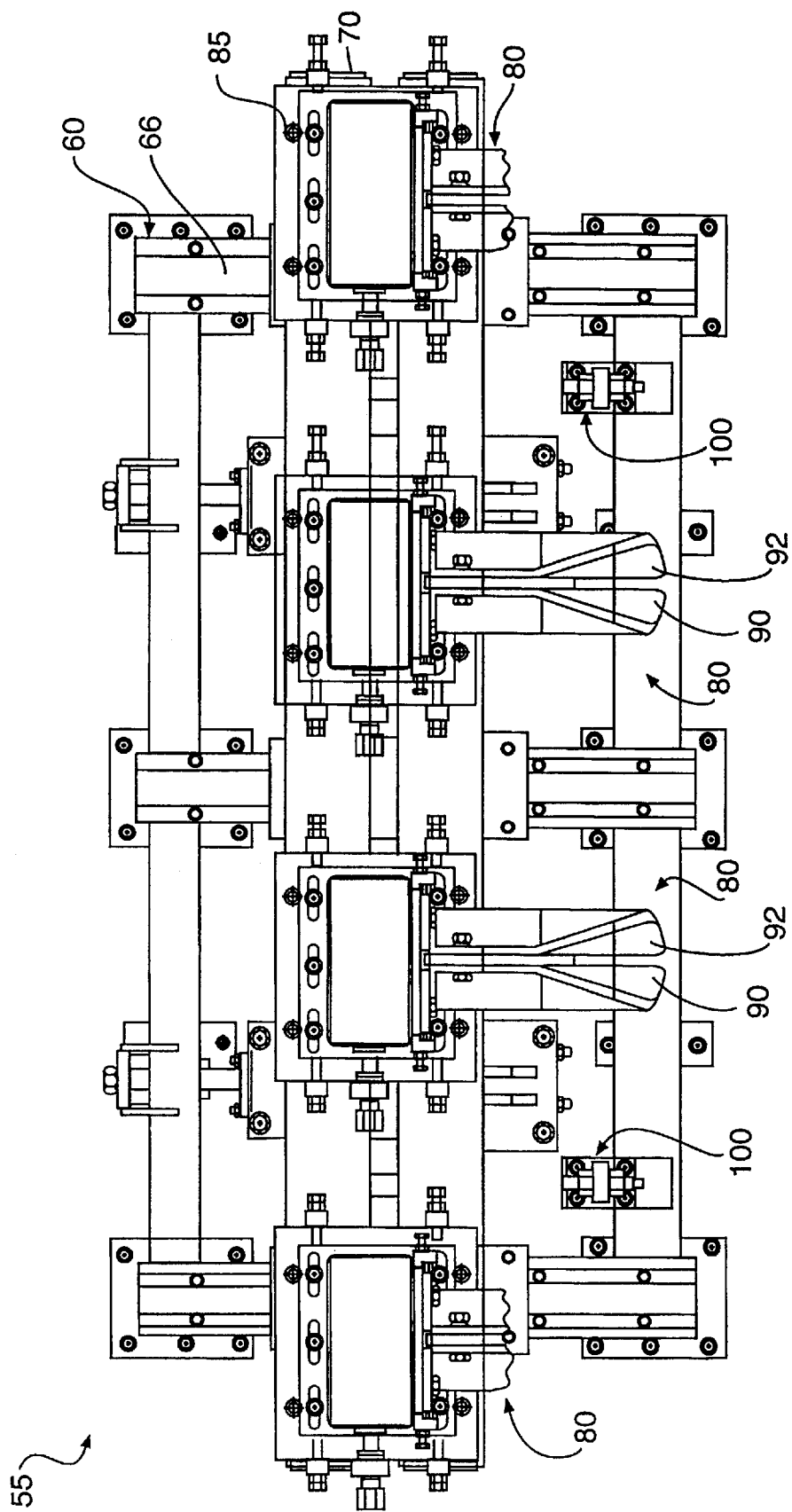
FIG. 6 is a top view of the stiffener locator unit of FIG. 5.

FIG. 6 illustrates the top view of the stiffener locator unit 55 of FIG. 5 of the present invention 10.

Figure 7:
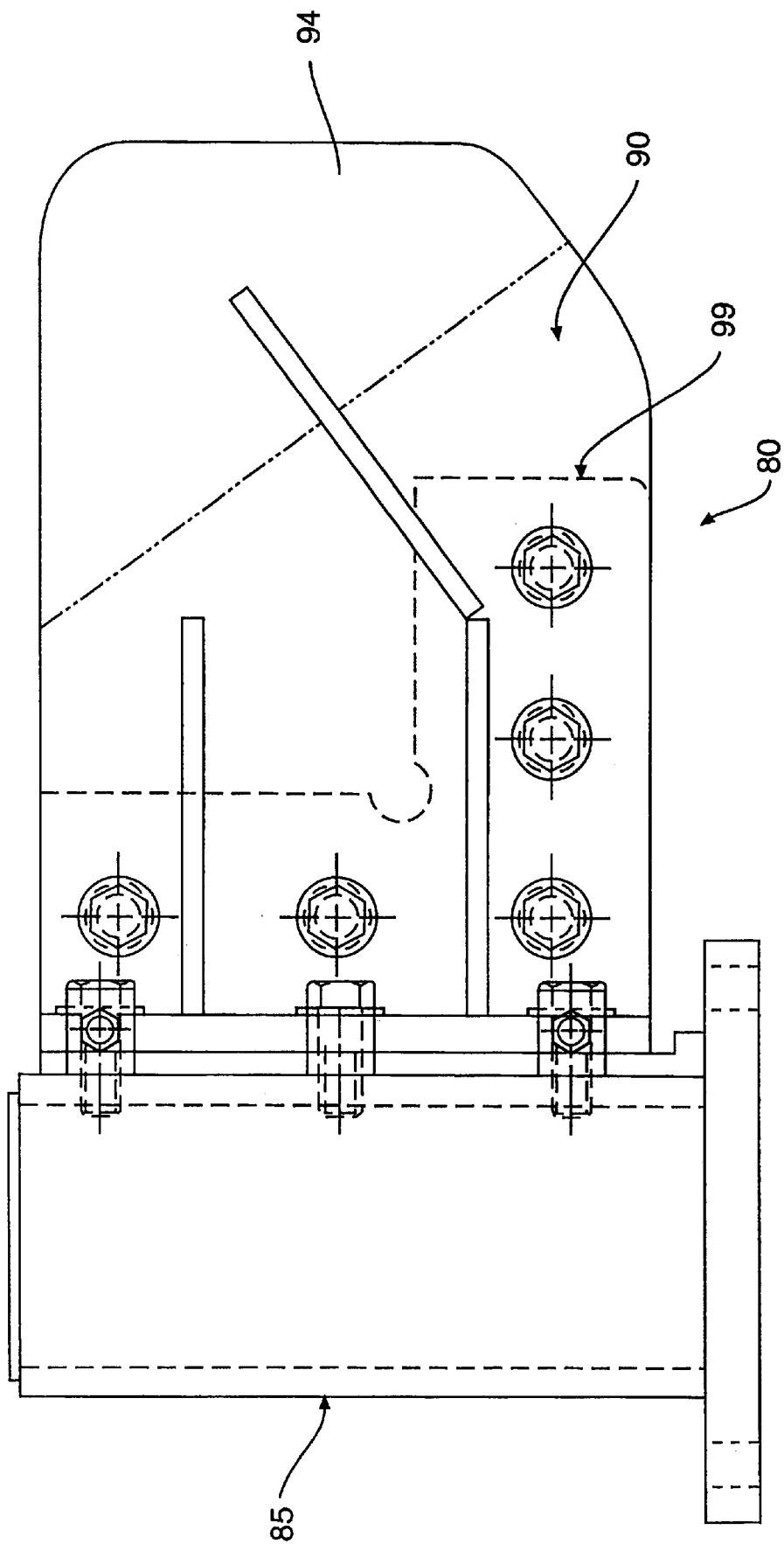
FIG. 7 is a side view of a stiffener locator of the present invention.

FIG. 7 illustrates the side view of a stiffener locator 80 of the present invention 10. Each locator 80 is made in three basic parts: a support assembly or support and mounting frame 85 and two locator guide plates 90, 92. Each of these locators 80 acts as a pre-positing pocket for first stage locating, as a guide for placing the stiffener 20 in a vertical position at each extreme end, and as a final and positive spacing locator. Each guide plate 90, 92 includes a tapered, angled end portion 94 and 96 respectively which act as a funnel to receive and guide the stiffeners into their desired position.

Each individual stiffener locator on stiffener locator pair 55 is adjustable to two extreme positions by a screw driven adjusting mechanism using manual manipulation or air operated rotational tool which requires no measurement or gauging.

All individual stiffener locators 80 have finite adjustment mechanisms within their base mount assemblies 85 to provide correction of spacing between adjacent locators.

All individual stiffener locators 80 are removable for repair and replacement and for allowing the changing of machined spacers 101 which are situated between each half of one stiffener locating element pair 90, 92 to make allowance for stiffeners of varying thickness. The machined spacers 101 are disks which are placed inside clearance holes in plate 99 at each assembly bolt (see FIG. 9). These disks provide the clearance between each half of locator set, thus forming pocket 98 (see FIG. 8). Therefore, plate 99 remains constant for varying stiffener thicknesses—only disks 101 are changed if necessary to provide fixed clearance for pocket 98.

Two adjustable stops 100 are used to select a positive position of each locator 80 when actuated to finally locate and position the stiffener during installation. The adjustable stop 100 is mounted on the base unit 60 of the frame and stops the movable upper unit 70 of the frame during its inward movement.

Pocket 98 is capable of receiving a removable plate pusher bar (not shown) that acts upon the panel edge when the stiffener locator is used to square the panel 25 in the transverse direction (side to side).

Inside the space between the two guide plates 90, 92 of each stiffener locator 80 is a plate 99 which acts upon the vertical ends of each stiffener. As the actuator moves the locator 80 inward, the plate 99 pushes the stiffener ends in one direction or the other as needed to centralize the stiffener 20 position relative to the panel 25 position.

To accomplish this centering function, the stiffener locators on one side of the panel line are selected as the datum side. The adjustable/fixed stops 100 on each locator unit are set to provide a straight line orientation of both the panel side and the stiffener ends including the proper relationship to each other.

The hydraulic pressure on the datum side locators is adjusted and set at higher pressure than the pressure actuating the opposite side locators. Thus, the opposite side locators will always square the panel and/or center the stiffeners on the panel without overcoming the predetermined position of the datum side locators.

Figure 8:
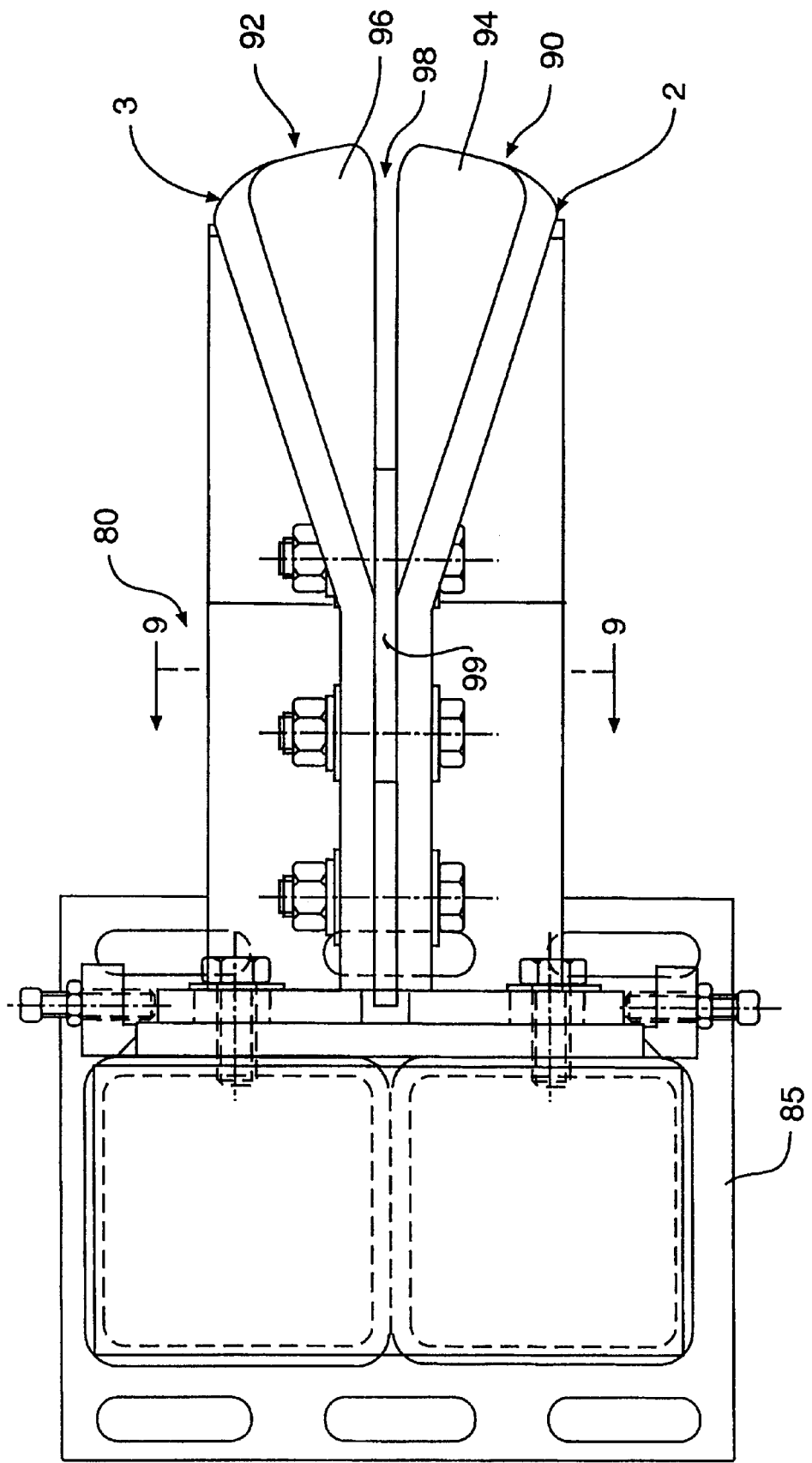
FIG. 8 is a top view of the stiffener locator of FIG. 7.

FIG. 8 illustrates the top view of the stiffener locator of FIG. 7 of the present invention 10. Locator 80 is shown mounted to support assembly 85. Locator 80 comprises guide plates 90, 92 having plate 99 therebetween. Guide plates 90, 92 have tapered, angled ends 94, 96 respectively.

Figure 9:
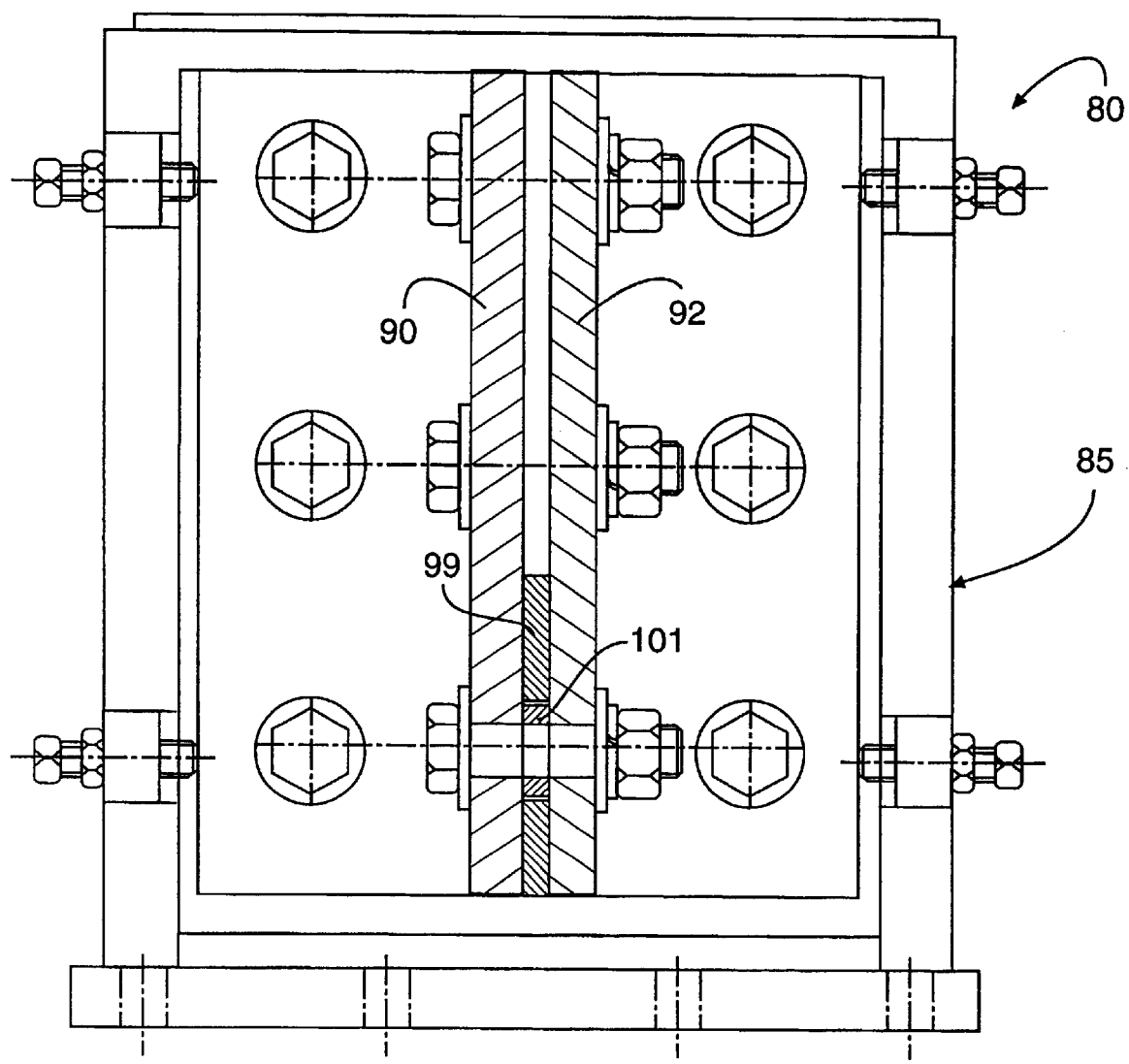
FIG. 9 is a cross-sectional view of the stiffener locator taken along line 9—9 of FIG. 8.

FIG. 9 illustrates the cross-sectional view of the stiffener locator 80 taken along line 9—9 of FIG. 8 of the present invention 10. The cross-section of guide plates 90, 92 can be seen. Between guide plates 90, 92, the cross-section of plate 99 can be seen. The cross-section of the machined spacer disk 101 can be seen positioned in a clearance hole in plate 99 at an assembly bolt.

Figure 10:
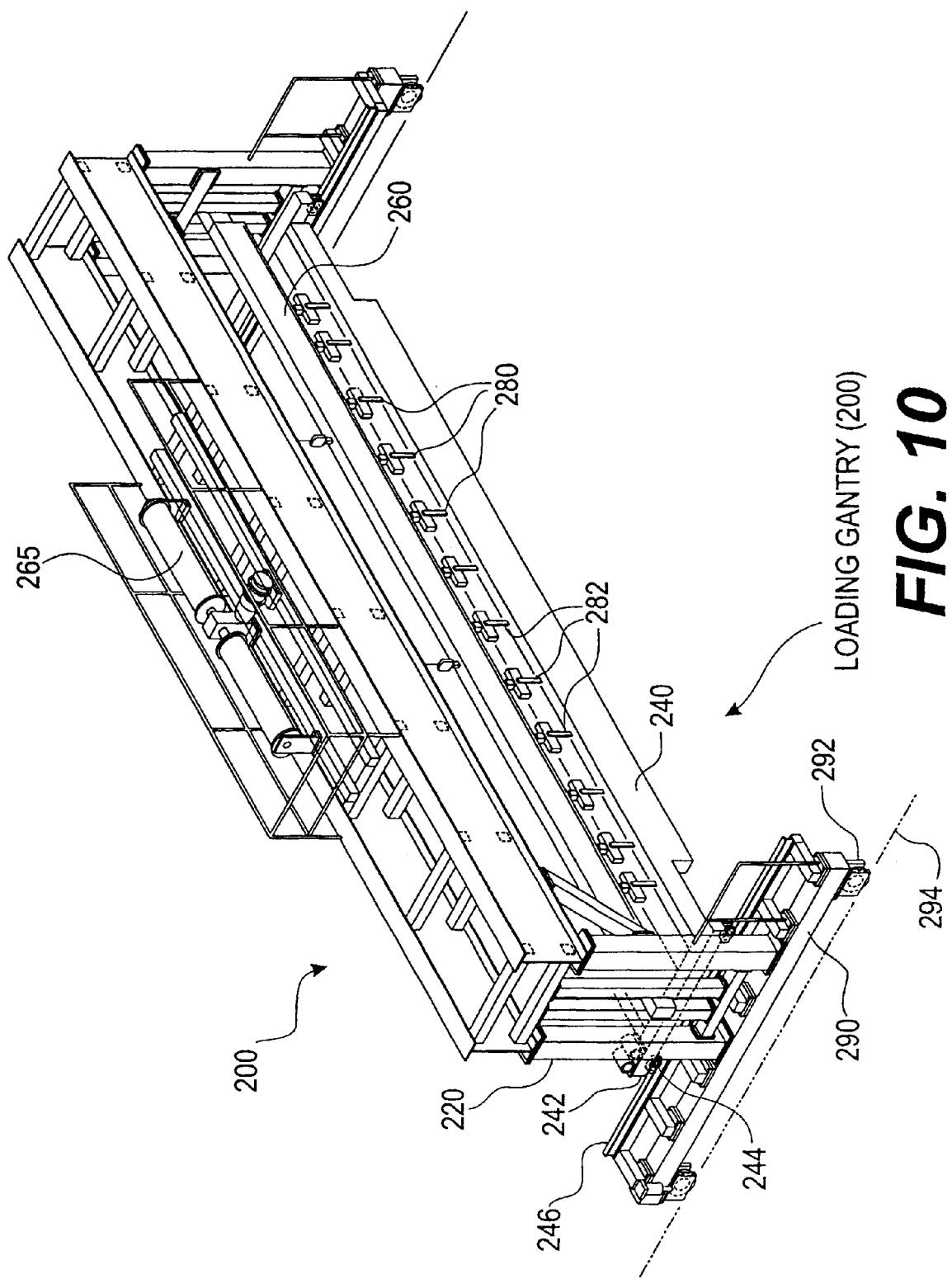
FIG. 10 is a perspective view of the stiffener handling/loading assembly of the present invention.
Figure 11:
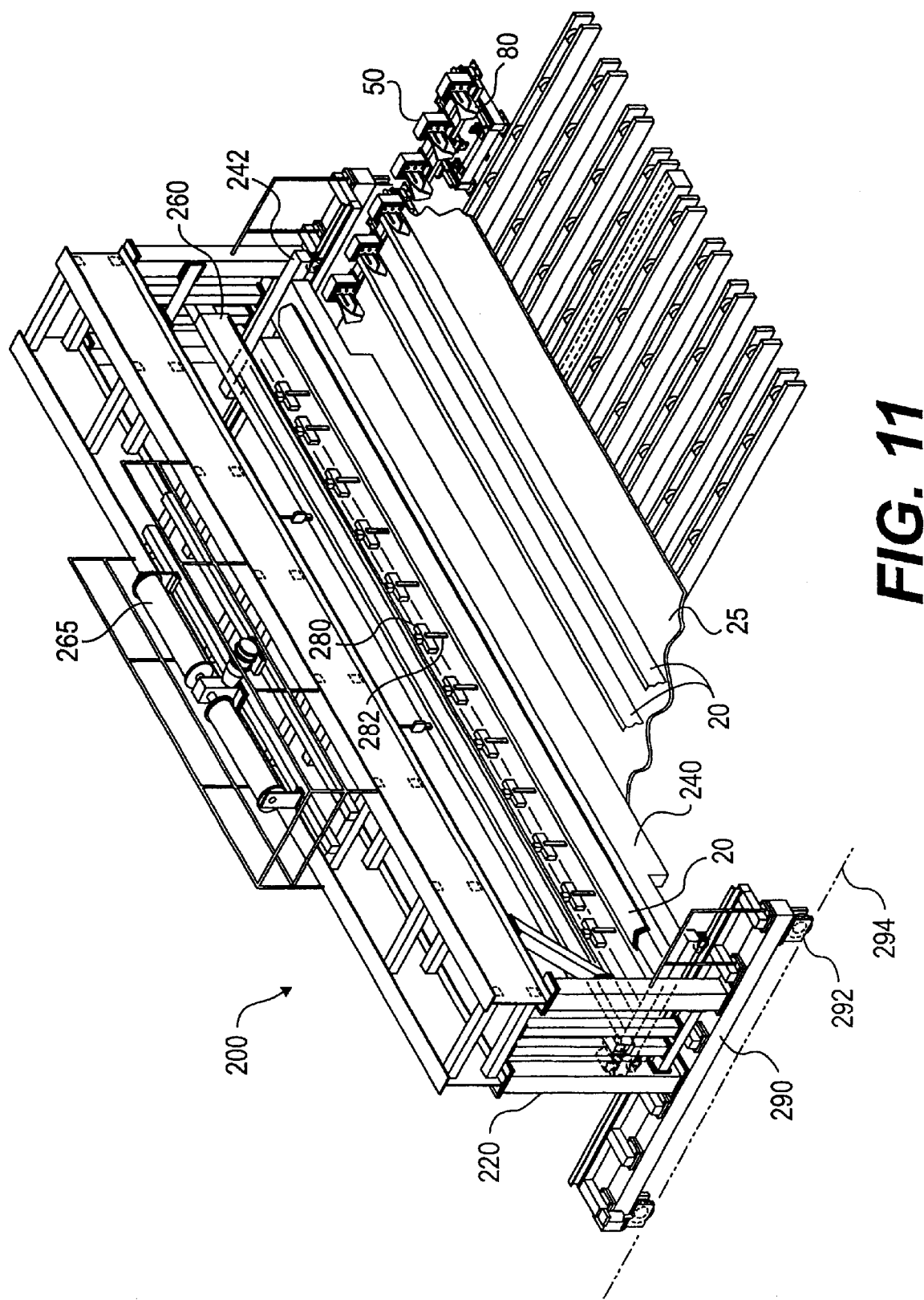
FIG. 11 is a perspective view of the stiffener handling/loading assembly positioned for use in the stiffener locator assembly.

FIGS. 10 and 11 illustrate a perspective view of the stiffener handling/loading assembly or gantry 200 of the present invention 10. The gantry 200 includes a frame 220 and a motorized platform 240 for receiving a stack of stiffeners 20 (see FIG. 13). The gantry further includes a lifting beam 260 equipped with electromagnets 280. Frame 220 is mounted upon a carriage 290 having wheels 292 which ride upon rails 294 running parallel to conveyor system 40 (see FIG. 1) such that assembly 200 can be selectively positioned along conveyor system 40 as desired.

The stiffener loading gantry 200 facilitates the material handling of the stiffeners 20 and the placement into the stiffener locator units 50 and 55. The tapered, angled ends 94, 96 of guide plates 90, 92 further facilitate placement of stiffener 20 into locators 80 by gantry 200.

The panel stiffeners 20 are placed upon the motorized platform 240 of the gantry in stacks which are in proper sequence for placement in the locators 80. The stacked stiffeners 20 are loaded onto motorized platform 240 mounted on the gantry via a carriage 242 having wheels 244 which ride upon rails 246. Platform 240 selectively reciprocates the stack of stiffeners in and out of position under the lifting beam 260 mounted on the gantry.

The lifting beam 260 is equipped with electromagnets 280. The beam is lowered via a hoist system 265 to each succeeding stiffener 20 to be lifted from the stack. Electromagnets 280 have a guide bar 282 attached thereto and depending therefrom. As beam 260 is lowered towards the stack of stiffeners 20 on platform 240, guide bar 282 contacts and rides down the side of the top stiffener. Such interaction of the guide bar 282 with stiffener 20 allows electromagnet 280 to pivot and align with the flange 22 (see FIG. 13) of the stiffener 20 as the beam 260 is continued to be lowered. In this manner, the electromagnets 280 can securely attach to flange 22 so that the stiffener 20 can be lifted in its vertical position as the beam 260 is raised by hoist system 265. Once the top stiffener 20 is lifted, the motorized platform 240 moves away exposing the suspended stiffener 20 to the paired stiffener locators 80 in the pre-positioned sequence. The stiffener 20 is then lowered via hoist system 265 into the paired stiffener locators 80 and the electromagnets 280 release the stiffener.

The lifting beam 260 is then raised. The gantry moves to the next stiffener position and is located by a limit switch. As the gantry moves, the stiffener platform 240 moves the next stiffener under the lifting beam 260 and the loading cycle is repeated as can be seen in FIG. 11.

All stiffeners 20 are preferably loaded into the locators 80 before the locators 80 are activated to precisely position the stiffeners. However, the controls are such that after the first set of six stiffeners are loaded into the locators, those locators can be functioned through the next sequence as subsequent stiffeners are being loaded.

Figure 12:
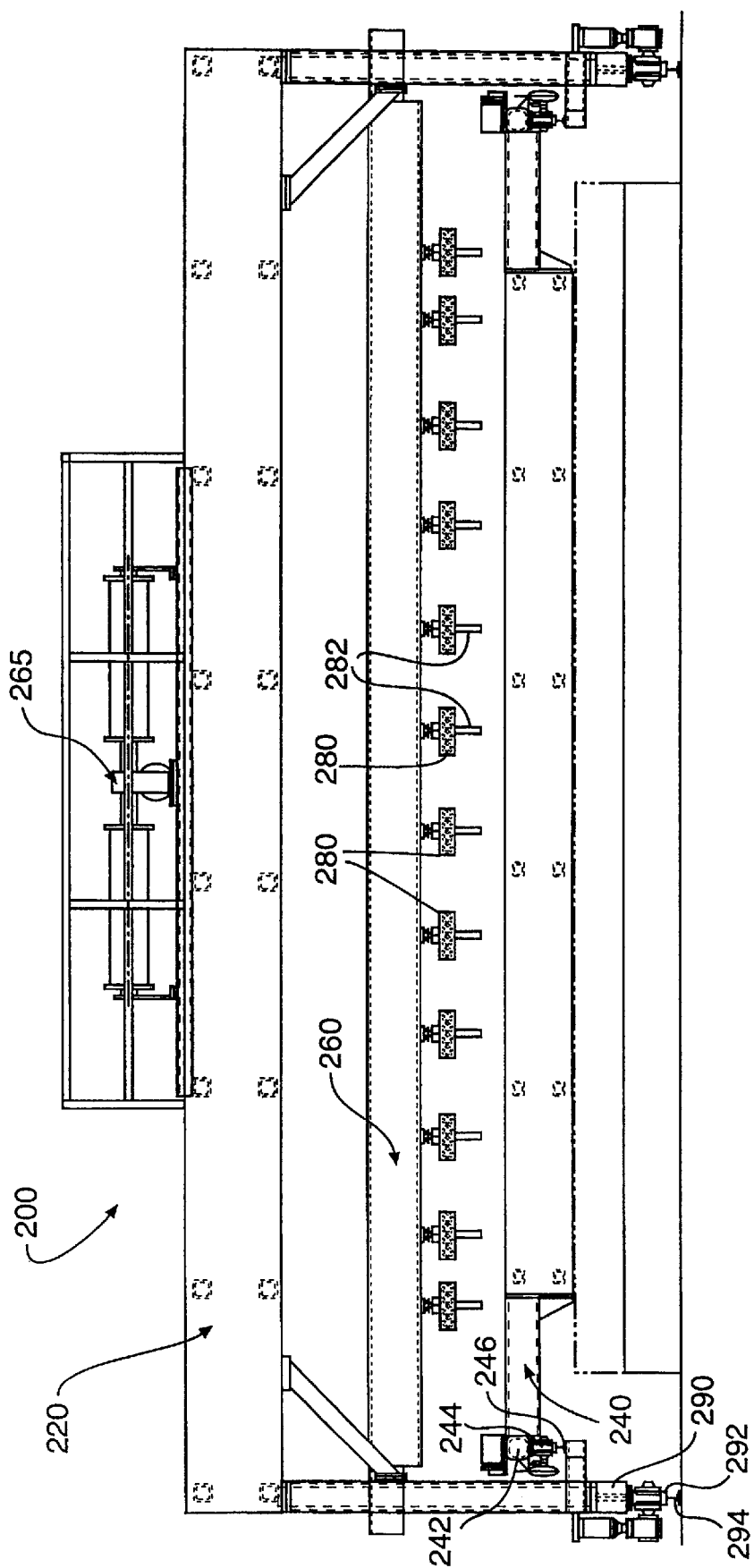
FIG. 12 is a front view of the stiffener handling/loading assembly of FIG. 10.

FIG. 12 illustrates the front view of the stiffener handling/loading assembly 200 of FIG. 10 of the present invention 10. As can be seen, the gantry 200 includes frame 220, moveable platform 240 is supported by carriage 242 having wheels 244 which ride upon rails 246 which are mounted to frame 220. Frame 220 itself is moveable via carriage 290 having wheels 292 which ride upon rails 294. Lifting beam 260 can be selectively raised and lowered via hoist system 265. Beam 260 includes a plurality of electromagnets which can engage stiffeners for placement into the locator units. Each electromagnet includes a guide bar 282 for proper positioning of the electromagnets with respect to the stiffeners.

Figure 13:
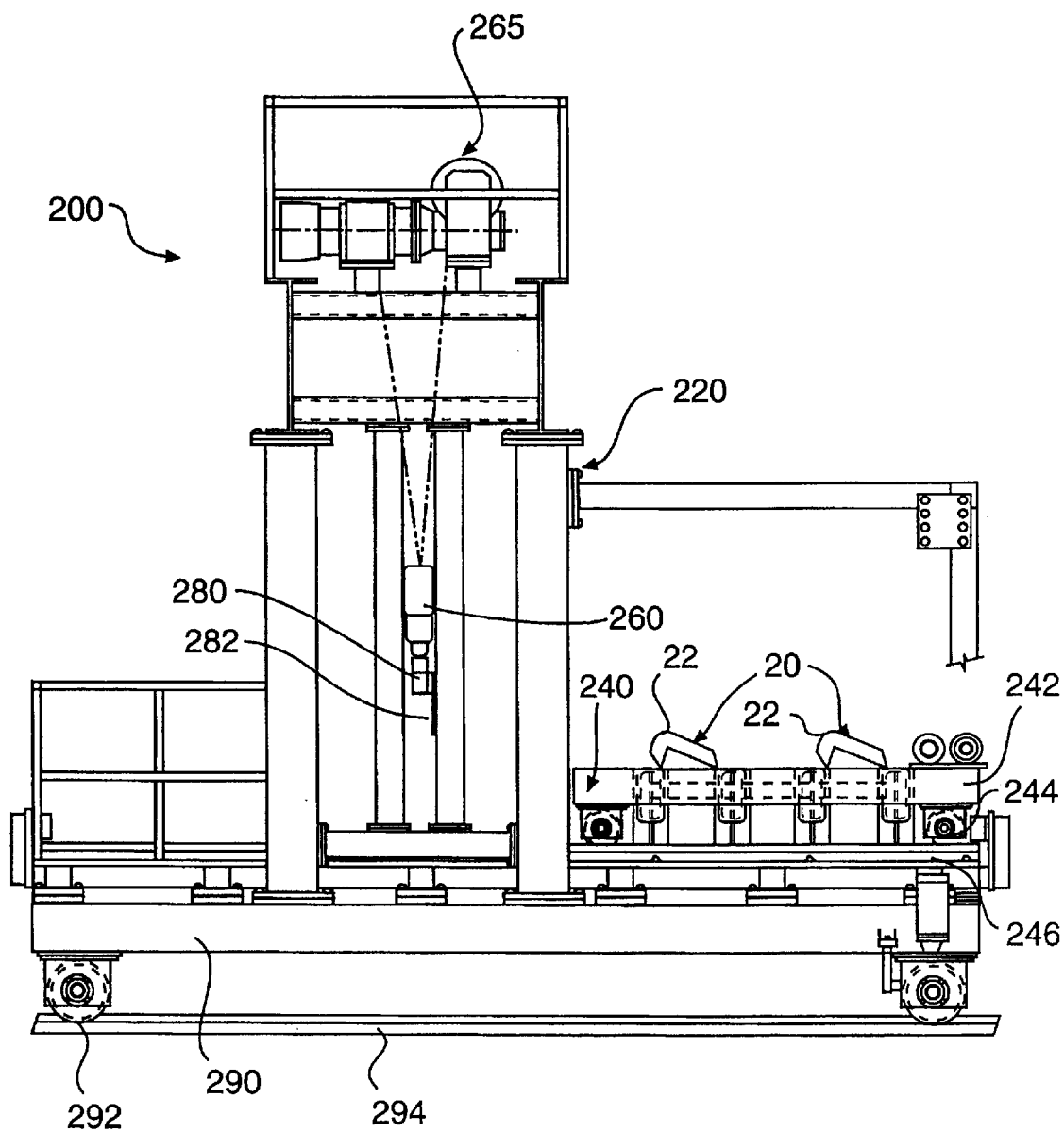
FIG. 13 is a side view of the stiffener handling/loading assembly of FIG. 10.

FIG. 13 illustrates the side view of the stiffener handling/loading assembly 200 of FIG. 10 of the present invention 10. Frame 220 includes carriage 290 having wheels 292 which ride upon rails 294. Platform 240 includes carriage 242 having wheels 244 which ride upon raise 246 mounted to frame 220. Stiffeners 20 rest upon platform 240 and include flanges 22. Platform 240 selectively moves the stiffeners into position under lifting beam 260. Lifting beam 260 is selectively raised and lowered via hoist system 265 so that electromagnets 280 engage stiffeners 20 at flange 22 after alignment therewith by guide bars 282.

Figure 14:
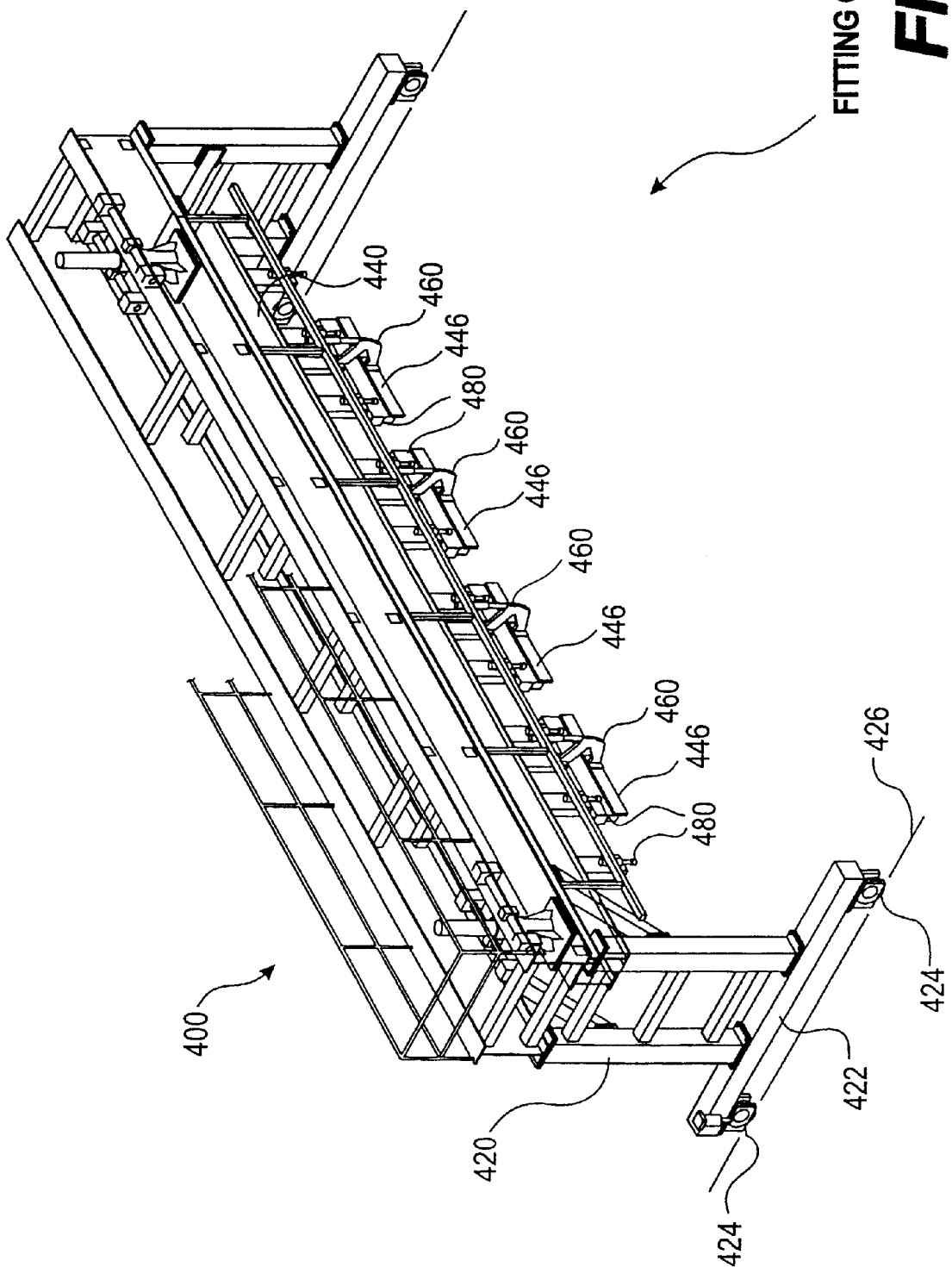
FIG. 14 is a perspective view of the stiffener fitting gantry of the present invention.
Figure 15:
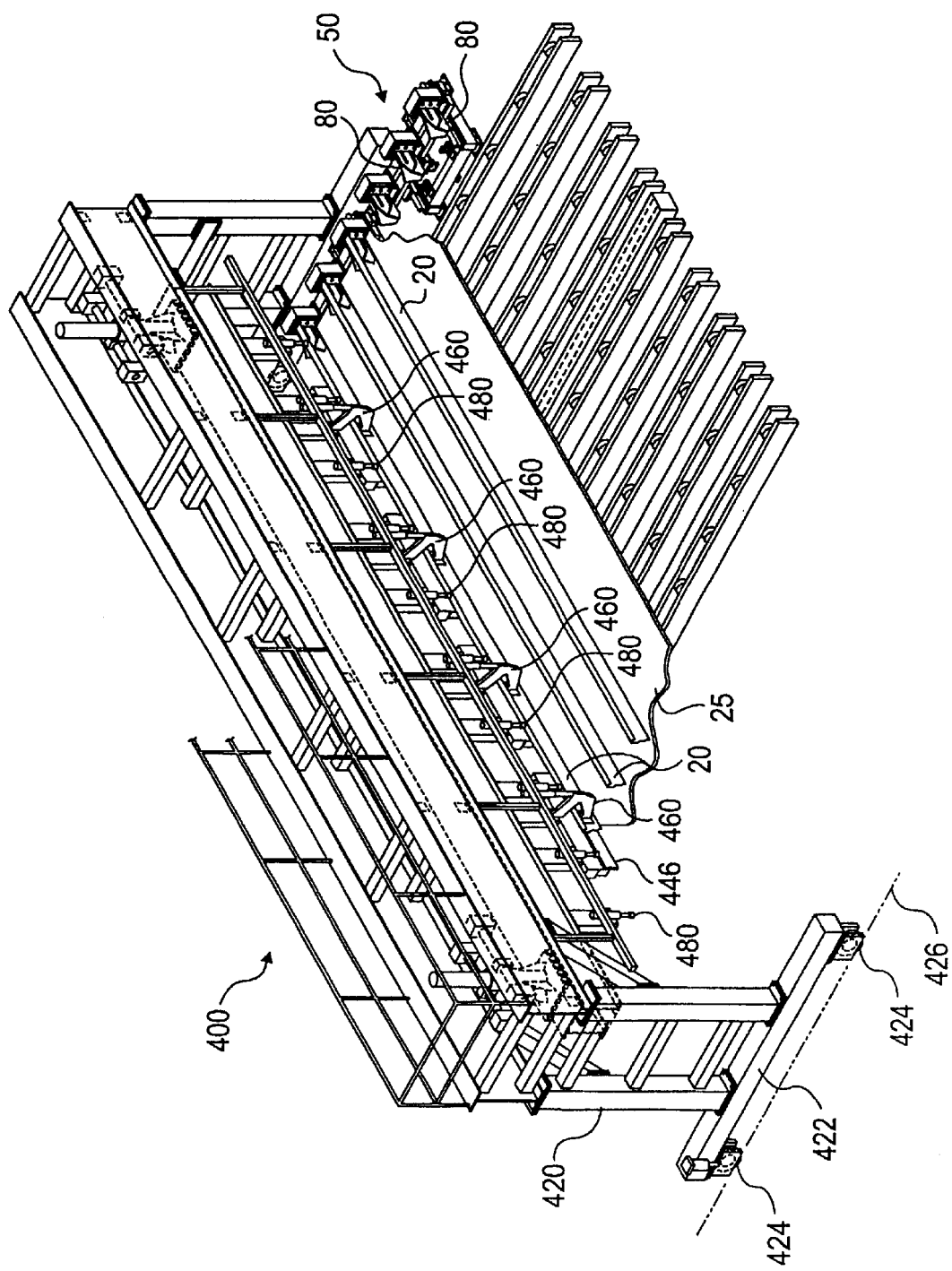
FIG. 15 is a perspective view of the stiffener fitting gantry positioned for use in the stiffener locator assembly.

FIGS. 14 and 15 illustrate the perspective view of the stiffener fitting gantry 400 of the present invention 10.

After gantry 200 has loaded one or more stiffeners and moves away therefrom, gantry 400 can be positioned to fit the loaded stiffener. The gantry 400 includes a frame 420 and is equipped with a positionable strongback fitting beam 440. Frame 420 is mounted to a carriage 422 having wheels 424 which ride upon rails 426 running parallel to conveyor system 40. The fitting beam 440 has a plurality of straight datum sidewalls or support walls 446 depending therefrom which locate against the extreme ends of the stiffener 20 adjacent to the paired stiffener locators. The fitting beam 440 raises and lowers to position the sidewalls 446 in between the located stiffeners 20. The beam further moves laterally and automatically senses the vertical surface of the stiffener 20 to stop the sidewalls 446 in the proper location next to the vertical surface of the stiffener through the use of limit switches after beam movement has been initiated by the machine operator.

When the beam 440 has located the sidewalls 446 next to the stiffener 20, the operator activates a plurality of swing away clamps 460 which are hydraulically actuated. These clamps press the vertical surface of the stiffener against the previously positioned sidewalls 446 of strongback beam 440 to straighten the curvature of the stiffener 20 between its two extreme ends. Such curvature is inherent in the stiffener which is formed in a press.

At this time, the gantry operator activates a series of hydraulic cylinder presses 480 mounted to and depending from the strongback fitting beam 440 which press the stiffener vertically downward against the panel 25 to obtain proper fit of each stiffener against the panel 25. Once properly positioned and braced, the stiffener 20 can be welded to the panel 25. After welding, the presses 480 are released, the clamps 460 are swung away, and the sidewalls 446 are raised such that the gantry 400 can be moved to the next stiffener as illustrated in FIG. 15.

Figure 16:
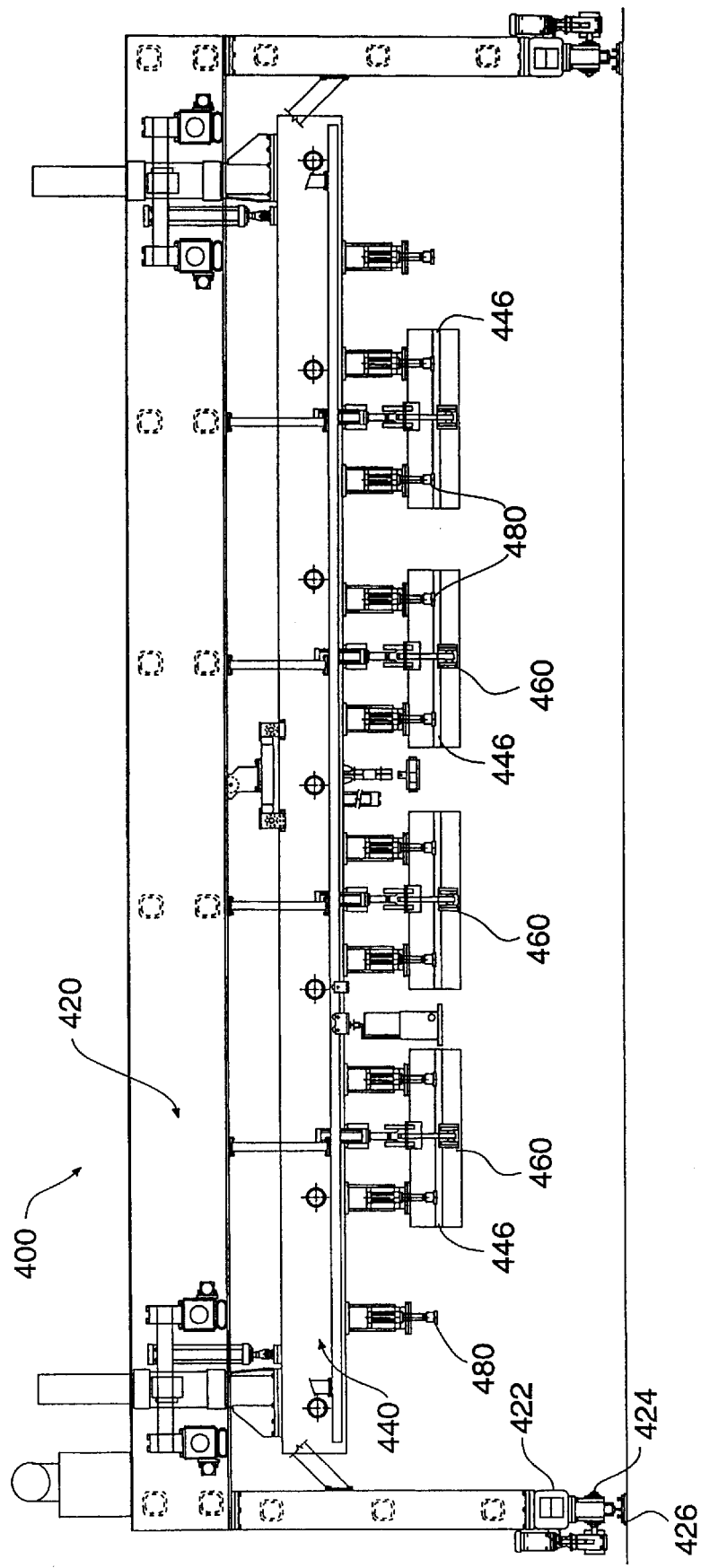
FIG. 16 is a front view of the stiffener fitting gantry of FIG. 14.

FIG. 16 illustrates the front view of the stiffener fitting gantry 400 of FIG. 14 of the present invention 10. Gantry 400 comprises a frame 420 mounted on a carriage 422 having wheels 424 which ride upon rails 426. Mounted on frame 420 for vertical and lateral movement is the strongback fitting beam 440. As illustrated herein, movement of beam 440 is achieved by means of hydraulic cylinders. However, it should be understood that movement could be achieved in any desired manner as is or may be known. Mounted to beam 440 and depending therefrom are a plurality of straight datum sidewalls. Mounted in association with each sidewall 446 is a press 480 for selectively holding stiffener 20 therebetween. Further mounted on beam 440 and depending therefrom are a plurality of presses 480.

Figure 17:
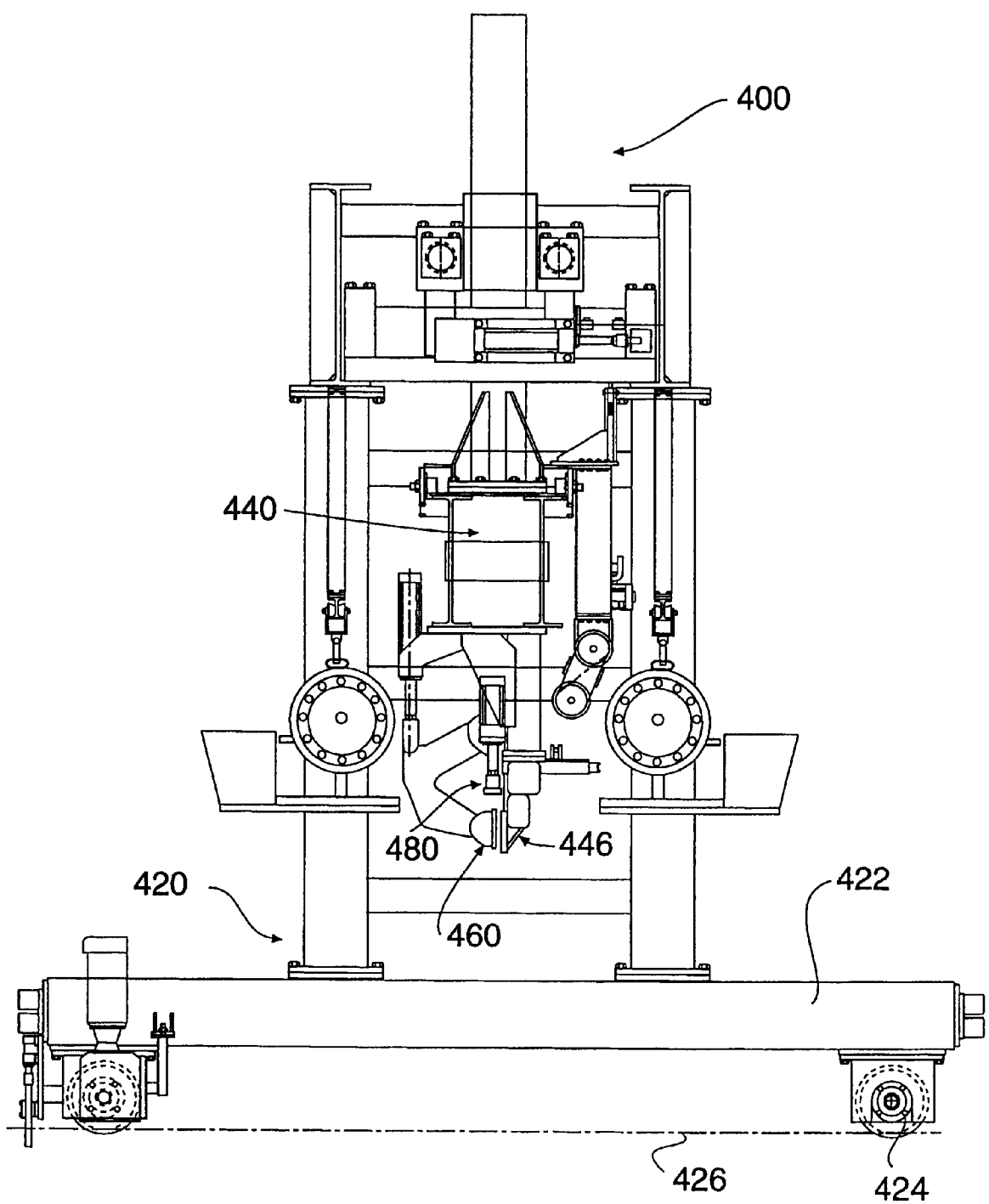
FIG. 17 is a side view of the stiffener fitting gantry of FIG. 14.

FIG. 17 illustrates a side view of the stiffener fitting gantry 400 comprising frame 420 mounted on carriage 422 having wheels 424 which ride upon rail 426. Fitting beam 440 is movably mounted to frame 420 and includes a plurality of sidewalls 446, clamps 460 and presses 480.

Figure 18:
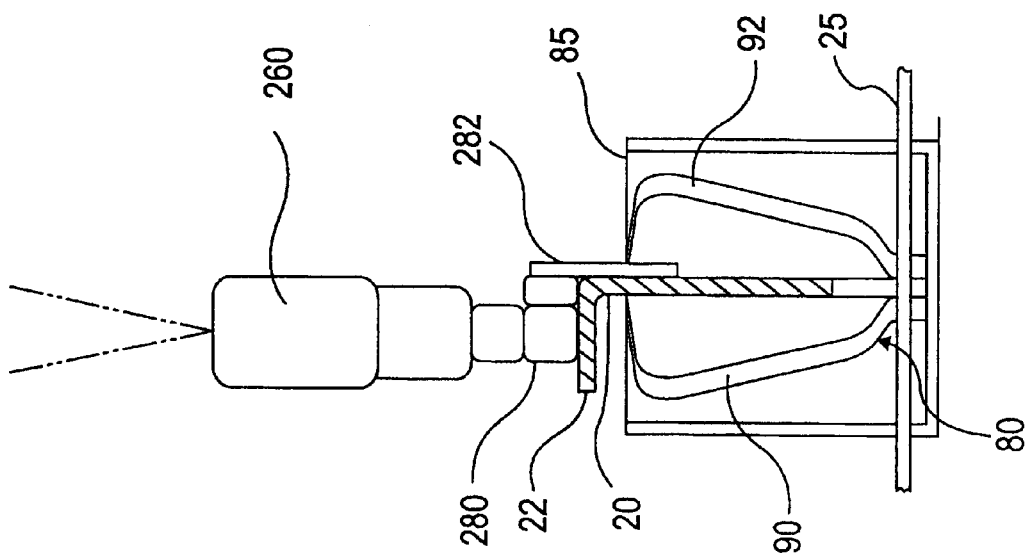
FIG. 18 is a partial side view of the stiffener handling/loading assembly loading a stiffener into a stiffener locator.

FIG. 18 is a partial side view illustrating a stiffener 20 being loaded into a locator 80 by loading gantry 200. As can be seen, electromagnet 280 engages flange 22 of the stiffener 20 which can then be raised and lowered by beam 260. Guide bar 282 aligns electromagnet 280 with flange 22. The ends of stiffener 20 are thus received between guide plates 90 and 92 for final locating.

Figure 19:
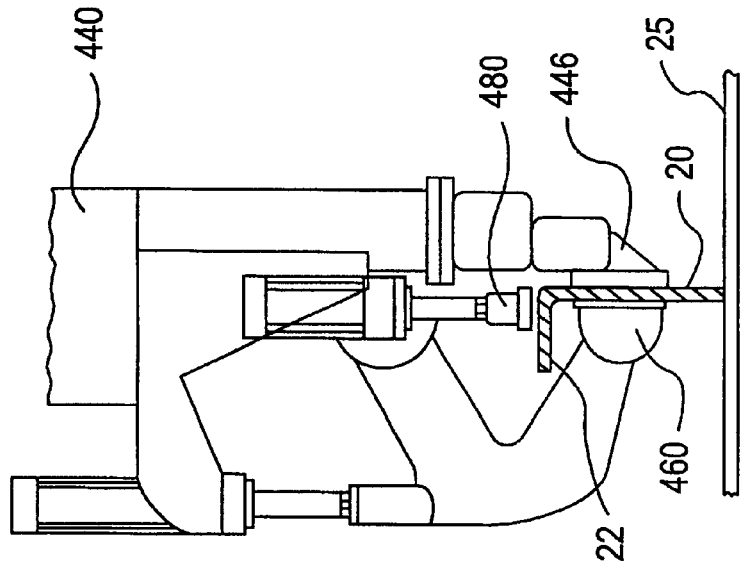
FIG. 19 is a partial side view of the stiffener fitting gantry holding a stiffener to the panel.

FIG. 19 is a partial side view of a stiffener 20 being fitted to panel 25 by the fitting gantry 400. As can be seen, support walls 446 are positioned by beam 440 against stiffener 20. Clamp 460 is then actuated to engage the opposite side of stiffener 20, thus entrapping stiffener 20 between clamp 460 and wall 446. Finally, press 480 is actuated to engage flange 22 and press stiffener 20 against panel 25. At this time, stiffener 20 can be tack welded to panel 25.

In use, panels 25 are transferred from the seam welding station (not shown) into the stiffener locator assembly 30 by conveyor rollers and a drag chain drive system 40. Located within the conveyor system are three parts of adjustable plate edge stops. These stops are used to locate the leading edge of the panel 25 relative to the stiffener locating devices. After the panel 25 has been lowered to the work table conveyor beams, hydraulic pushers located at the trailing edge of the incoming panel are used to gently square each panel's leading edge against their respective stops.

At this time, two of the stiffener locator units located on each side of the panel 25 are used to square and also center the panel 25 in the transverse direction in preparation for placement of panel stiffeners 20. The plate stops and the stiffener locator units are positioned relative one to the other so as to provide accurate location and spacing of the panel stiffeners 20 on the panel 25.

The panel stiffeners 20 are placed upon the motorized platform 240 of the stiffener loading gantry 200 in stacks. The motorized platform 240 reciprocates the stack of stiffeners in and out of position under the lifting beam 260 mounted on the gantry 200.

The lifting beam 260, equipped with electromagnets 280, is lowered to each succeeding stiffener and lifted from the stack. The motorized platform 240 moves away exposing the suspended stiffener 20 to the stiffener locators 80 in the pre-positioned sequence. The stiffener 20 is then lowered into the stiffeners locators 80.

The lifting beam 260 is then raised and the gantry 200 moves to the next stiffener position. As the gantry 200 moves, the stiffener platform 240 moves the next stiffener 20 under the lifting beam 260 and the loading cycle is repeated.

After loaded into the locators 80, the locators 80 are activated to fully locate and center the stiffeners 20 in their vertical position on the panel 25.

After the stiffeners 20 have been fully loaded, located and centered on the panel 25, the stiffener fitting gantry 400 is used to straighten and vertically press each succeeding stiffener 20 against the panel 25 for preliminary tack welding.

The strongback fitting beam 440 locates the straight datum sidewalls 446 next to the stiffener 20 and the operator activates the swing away clamps 460 to press the vertical surface of the stiffener 20 against the previously positioned sidewalls 446 to straighten the curvature of the stiffener 20 between its two extreme ends. At this time, the gantry operator activates the hydraulic cylinder presses 480 mounted on the strongback fitting beam 440 to press the stiffener vertically downward against the flat panel 25.

The operator will then tack weld the stiffener 20 to the panel 25 in several places by any suitable method. The sequence previously described is then repeated in succession until each of the previously located stiffeners 20 are securely tack welded in place.

The completed tack welded panel assembly is then moved to the final welding station where it is finish welded by an automatic welding gantry (not shown) which preferably welds three stiffeners simultaneously.

It should be understood that the embodiments herein described are merely illustrative of the principles of the present invention. Various modifications may be made by those skilled in the art without departing from the spirit or scope of the claims which follow.

What is claimed is:

1. A system for locating and positioning stiffeners on panels, said system comprising: at least one stiffener locator unit for receiving an end of said stiffener to position said stiffener in a desired position, wherein said at least one stiffener locator unit comprises at least one stiffener locator having a pair of locator guide plates, and a squaring plate positioned between and spacing said pair of guide plates to define a plate squaring pocket; a stiffener loading gantry cooperatively associated with said at least one stiffener locator unit; and a stiffener fitting gantry cooperatively associated with said at least one stiffener locator unit.

2. The system of claim 1, wherein said locator guide plates include an angled end portion.

3. The system of claim 1, wherein said stiffener loading gantry comprises a means for selectively lifting said stiffener.

4. The system of claim 3, wherein said means for lifting includes at least one stiffener engaging element for engaging and positioning said stiffeners.

5. The system of claim 4, wherein said at least one stiffener engaging element is an electromagnet.

6. The system of claim 4, wherein said at least one stiffener engaging element includes a guide bar for locating said at least one stiffener engaging element relative to said stiffeners.

7. The system of claim 4, wherein said at least one stiffener engaging element is mounted on a moveable lifting beam.

8. The system of claim 1, wherein said stiffener fitting gantry comprises a means for holding said stiffeners to said panels.

9. The system of claim 8, wherein said means for holding includes:
   at least one support wall for abutting one of said stiffeners; and
   at least one clamp for selectively clamping one of said stiffeners between said support wall and said clamp.

10. The system of claim 9, wherein said means for holding further includes at least one press for pressing one of said stiffeners to said panel.

11. The system of claim 10, wherein said at least one support wall, said at least one clamp element and said at least one press are mounted on a moveable beam.

12. The system of claim 1, wherein said squaring plate includes at least one hole therethrough for receiving a spacer.

13. The system of claim 1, wherein said at least one stiffener locator numbers three such that said at least one stiffener locator unit is adapted to receive three stiffeners.

14. The system of claim 1, wherein said at least one stiffener locator numbers four such that said at least one stiffener locator unit is adapted to receive four stiffeners.

15. A panel stiffening assembly for locating and positioning stiffeners, having ends, on panels, said assembly comprising:
   a conveyor system for moving panels;
   at least one pair of stiffener locator units for receiving the ends of said stiffeners, each stiffener locator unit of said at least one pair being diametrically opposed on opposite sides of said conveyor system;
   a stiffener loading gantry positionable along said conveyor system and said at least one pair of stiffener locator units, and including a means for loading stiffeners into said at least one pair of stiffener locator units; and
   a stiffener fitting gantry positionable along said conveyor system and including a means for fitting stiffeners to said panel.

16. The assembly of claim 15, wherein said at least one pair of stiffener locator units each including at least one stiffener locator for receiving an end of said stiffeners.

17. The assembly of claim 16, wherein said at least one stiffener locator comprises a pair of locator guide plates, at least one of said pair of locator guide plates having an angled portion.

18. The assembly of claim 17, wherein said at least one stiffener locator further includes a squaring plate positioned between and spacing said pair of guide plates to define a plate squaring pocket, said squaring plate includes at least one hole therethrough for receiving a spacer.

19. The assembly of claim 17, wherein said at least one stiffener locator is a plurality of stiffener locators such that said at least one stiffener locator unit is adapted to receive a plurality of stiffeners.

20. The assembly of claim 15, wherein said stiffener loading gantry comprises a means for engaging and positioning said stiffeners in said at least one pair of stiffener locator units.

21. The assembly of claim 20, wherein said means for engaging and positioning includes at least one electromagnet.

22. The assembly of claim 20, wherein said means for engaging and positioning said stiffeners includes at least one stiffener engaging element, said at least one stiffener engaging element includes a guide bar for locating said at least one stiffener engaging element relative to said stiffeners.

23. The assembly of claim 15, wherein said stiffener fitting gantry comprises means for holding said stiffeners to said panels.

24. The assembly of claim 23, wherein said means for holding includes:
   at least one support element for abutting said stiffeners; and
   at least one clamp element for selectively clamping one of said stiffeners between said support wall and said clamp element.

25. The assembly of claim 24, wherein said means for holding further includes at least one press.

26. The assembly of claim 15, wherein said stiffener loading gantry straddles said conveyor system and said at least one pair of stiffener locator units, to allow said stiffener loading gantry to be freely movable along said conveyor system without interference from said at least one pair of stiffener locator units.

27. The assembly of claim 15, wherein said stiffener fitting gantry straddles said conveyor system and said at least one pair of stiffener locator units, to allow said stiffener fitting gantry to be freely movable along said conveyor system without interference from said at least one pair of stiffener locator units.

28. The assembly of claim 15, wherein said at least one pair of stiffener locator units is a plurality of stiffener locator units positioned along said conveyor system, to allow a plurality of stiffeners to be loaded by said stiffener loading gantry independent of said stiffener fitting gantry.

* * * * *